United States Patent
Garcia Navarro (10) Patent No.: US 9,596,429 B2
(45) Date of Patent: Mar. 14, 2017

(54) APPARATUS, SYSTEMS AND METHODS FOR PROVIDING CONTENT WHEN LOUD BACKGROUND NOISE IS PRESENT

(71) Applicant: EchoStar Technologies L.L.C., Englewood, CO (US)

(72) Inventor: Carlos Garcia Navarro, Boulder, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/707,368

(22) Filed: May 8, 2015

(65) Prior Publication Data

US 2016/0330396 A1    Nov. 10, 2016

(51) Int. Cl.
| | |
|---|---|
| *H04N 5/60* | (2006.01) |
| *H04N 7/15* | (2006.01) |
| *G06T 11/60* | (2006.01) |
| *G10L 15/26* | (2006.01) |
| *G10L 21/0364* | (2013.01) |
| *H04N 5/44* | (2011.01) |

(Continued)

(52) U.S. Cl.
CPC .............. *H04N 5/60* (2013.01); *G06T 11/60* (2013.01); *G10L 15/26* (2013.01); *G10L 21/0364* (2013.01); *G10L 21/10* (2013.01); *H04N 5/4403* (2013.01); *H04N 5/445* (2013.01); *H04N 7/15* (2013.01); *H04N 2005/4428* (2013.01); *H04N 2005/44526* (2013.01)

(58) Field of Classification Search
USPC ....... 348/738, 734, 719, 716, 714, 515, 523, 348/533, 567, 474, 211.1, 231.3, 241, 348/164, 14.02; 381/56, 57, 66, 71.1, 381/71.2, 71.6, 71.9, 73.1, 91, 92, 94.1, 381/94.7, 94.9, 104, 105, 106, 111, 120, 381/122, 313, 355, 369, 375; 704/226, 704/228, 233, 262, 278, 208, 205, 200, 704/503; 725/32, 34, 36, 37, 39, 44, 98, 725/106; 715/763, 764, 765; 709/217
See application file for complete search history.

(56) References Cited

U.S. PATENT DOCUMENTS

| | | | | |
|---|---|---|---|---|
| 6,055,502 A | * | 4/2000 | Kitamura | G10H 1/46 704/500 |
| 7,567,677 B1 | * | 7/2009 | Chan | G06F 1/1616 381/71.1 |

(Continued)

*Primary Examiner* — Jefferey Harold
*Assistant Examiner* — Mustafizur Rahman
(74) *Attorney, Agent, or Firm* — Lowe Graham Jones PLLC (57) ABSTRACT

Media content presentation systems and methods are operable to present a media content event comprising a video portion and an associated audio portion to a user. An exemplary embodiment compares a detected level of background noise with a first background noise level threshold; increases output volume of the presented audio portion of the media content event when the level of background noise exceeds the first background noise level threshold; determines text when the level of background noise exceeds a second background noise level threshold; determines sentences from the determined text; and presents on a display the beginning portion of a current sentence in the dialog of the text when the increasing level of background noise exceeds a maximum background noise level threshold.

18 Claims, 3 Drawing Sheets

(51) Int. Cl.
*H04N 5/445* (2011.01)
*G10L 21/10* (2013.01)

(56) References Cited

U.S. PATENT DOCUMENTS

| | | | | |
|---|---|---|---|---|
| 7,760,893 B1 * | 7/2010 | Felber | H03G 3/32 | 381/104 |
| 7,787,697 B2 * | 8/2010 | Ritzau | G06K 9/228 | 382/115 |
| 8,046,689 B2 * | 10/2011 | Naik | H04L 29/06027 | 715/716 |
| 8,649,526 B2 * | 2/2014 | Vernon | G10K 11/1782 | 381/71.1 |
| 8,768,692 B2 * | 7/2014 | Hayakawa | G10L 15/20 | 704/226 |
| 8,798,992 B2 * | 8/2014 | Gay | G10L 21/028 | 381/107 |
| 2003/0088412 A1 * | 5/2003 | Shetty | G10L 15/14 | 704/243 |
| 2005/0038661 A1 * | 2/2005 | Momosaki | G10L 25/00 | 704/275 |
| 2006/0044479 A1 * | 3/2006 | Heo | H04N 5/445 | 348/738 |
| 2006/0221257 A1 * | 10/2006 | Nakayama | H04N 5/44513 | 348/738 |
| 2007/0253578 A1 * | 11/2007 | Verdecanna | H03G 3/10 | 381/104 |
| 2008/0077403 A1 * | 3/2008 | Hayakawa | G10L 15/20 | 704/233 |
| 2009/0234708 A1 * | 9/2009 | Heiser, II | G06Q 30/02 | 705/14.17 |
| 2009/0320063 A1 * | 12/2009 | Barrett | H04N 21/23418 | 725/34 |
| 2010/0121636 A1 * | 5/2010 | Burke | G06F 3/0346 | 704/233 |
| 2011/0051016 A1 * | 3/2011 | Malode | H03G 1/02 | 348/734 |
| 2011/0170842 A1 * | 7/2011 | Krikorian | H04L 12/2818 | 386/291 |
| 2011/0219413 A1 * | 9/2011 | Krikorian | G11B 27/034 | 725/109 |
| 2011/0271227 A1 * | 11/2011 | Takahashi | G06F 3/0481 | 715/800 |
| 2012/0215929 A1 * | 8/2012 | Lucas | H04L 65/1043 | 709/227 |
| 2012/0226502 A1 * | 9/2012 | Ouchi | H04N 5/4403 | 704/275 |
| 2012/0303274 A1 * | 11/2012 | Su | G01C 21/3632 | 701/533 |
| 2013/0272681 A9 * | 10/2013 | Krikorian | H04L 12/2818 | 386/291 |
| 2013/0302008 A1 * | 11/2013 | Kwon | H04N 21/414 | 386/230 |
| 2014/0153747 A1 * | 6/2014 | Contolini | G06F 19/34 | 381/122 |
| 2014/0184905 A1 * | 7/2014 | Mountain | H04N 21/4884 | 348/384.1 |
| 2014/0359057 A1 * | 12/2014 | Hensgen | H04L 67/1095 | 709/217 |
| 2015/0039311 A1 * | 2/2015 | Clark | G10L 15/063 | 704/244 |
| 2015/0074527 A1 * | 3/2015 | Sevigny | G06F 3/165 | 715/716 |

* cited by examiner

APPARATUS, SYSTEMS AND METHODS FOR PROVIDING CONTENT WHEN LOUD BACKGROUND NOISE IS PRESENT

BACKGROUND

In some situations, background noise (ambient noise) may interfere with a user's viewing experience when viewing and listening to a presented media content event. When the background noise level in the immediate vicinity of the user becomes too high, the user may not be able to discern the audio content portion of the presented media content event.

For example, the user may be viewing a particular media content event, such as a movie, serial program, sporting event, news broadcast, or the like, on their media entertainment system. The video content portion of the media content event is presented on a suitable display, monitor, television (TV) or the like. The audio content portion of the media content event is presented by a sound system and/or speakers of the TV, for example.

A hypothetical situation of an example loud background noise may be a noisy construction project that is underway in the vicinity of their media room where the user is attempting to view and listen to the media content event. From time to time, the outside noise level from the construction project may be significantly loud such that the background noise level in the immediate vicinity of the user (due to the construction noise) interferes with the presentation of the audio portion of the media content event. That is, the background noise may impair the user's ability to discern the dialogue of the audio content, and/or may become a distraction to the user's enjoyment.

Legacy media content presentation systems, such as the system disclosed in EP 1816860A1 (incorporated by reference herein in its entirety), detects such distracting and interfering background noise levels. The detected level of the background noise is then compared to the output audio volume of the presented media content event. When the detected background noise level increases above a threshold with respect to the output audio volume, or when the ratio of the background noise level to audio volume level exceeds some threshold, a textual description of the audio content is presented to the user concurrently with presentation of the video content.

Although such legacy systems provide some level of improvement to the user's experience when background noise levels increase to a level that interferes with the user's listening (thereby then presenting text corresponding to the audio content which the user may then read), such systems only marginally improve the user's experience.

Accordingly, there is a need in the arts to further improve legacy systems that merely compare the background noise level in the vicinity of the user with the output audio volume, and then simply present text corresponding to the dialogue of the audio content when the background noise level becomes too high.

SUMMARY

Systems and methods of presenting a media content event comprising a video portion and an associated audio portion to a user are disclosed. An exemplary embodiment compares a detected level of background noise with a first background noise level threshold; increases output volume of the presented audio portion of the media content event when the level of background noise exceeds the first background noise level threshold; determines text when the level of background noise exceeds a second background noise level threshold; determines sentences from the determined text; and presents on a display the beginning portion of a current sentence in the dialogue of the text when the increasing level of background noise exceeds a maximum background noise level threshold.

BRIEF DESCRIPTION OF THE DRAWINGS

Preferred and alternative embodiments are described in detail below with reference to the following drawings.

DETAILED DESCRIPTION

Figure 1:
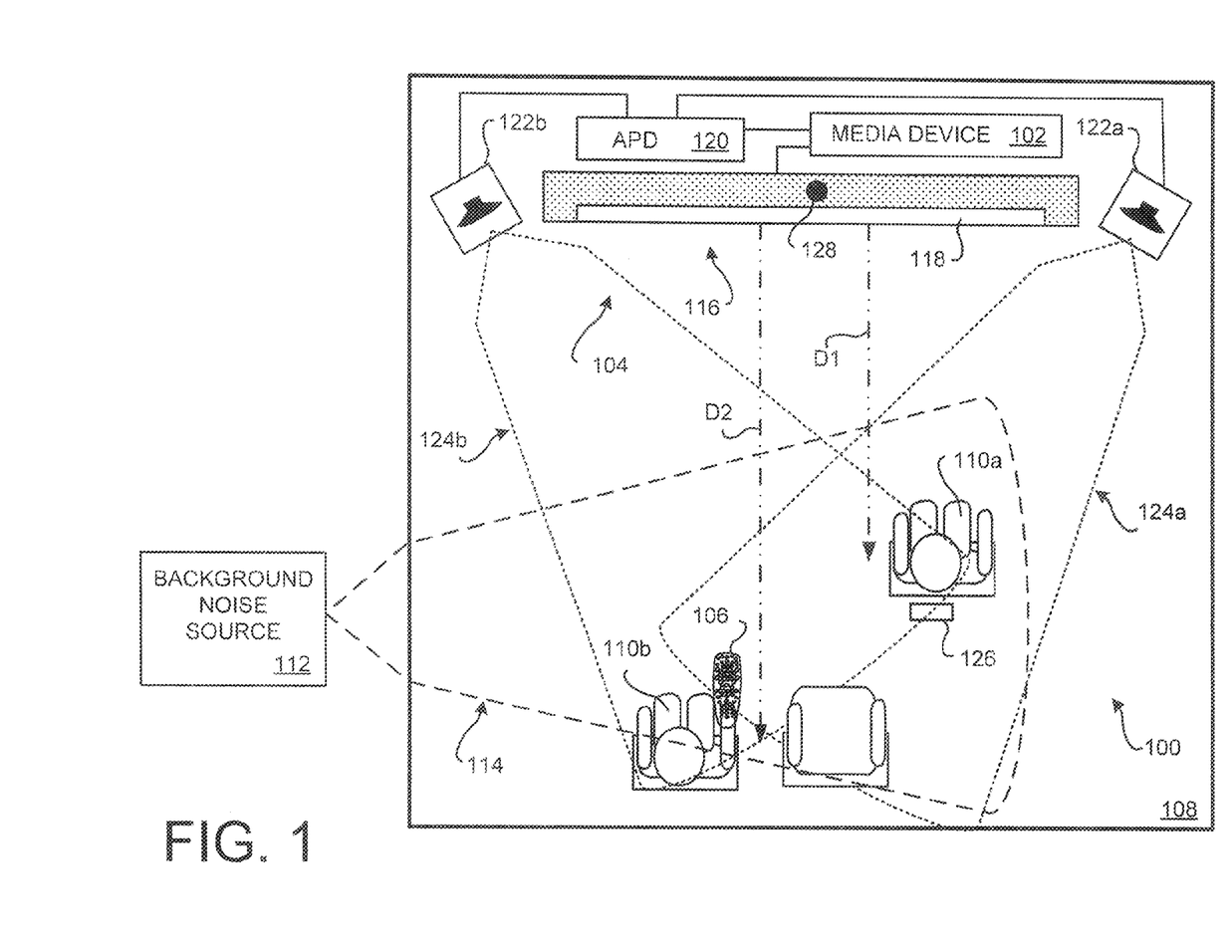
FIG. 1 is a block diagram of an embodiment of the media content presentation system.

FIG. 1 is a block diagram of an embodiment of the media content presentation system 100. The example media content presentation system 100 comprises a media device 102, a media presentation system 104, and a remote control 106. The media content presentation system 100 is understood to be operating in a media environment 108 where at least one of a plurality of users 110a, 110b are viewing and listening to presented media content. However, a background noise source 112 is creating a loud level of background noise 114 that interferes with the ability of the users 110a, 110b to discern the dialogue of the audio portion of the presented media content event. Further, the background noise 114 is likely interfering in the enjoyment of the users 110a, 110b in their viewing of the media content event.

The exemplary media device 102 is communicatively coupled to the media presentation system 104 that includes a visual display device 116, such as a television (hereafter, generically a TV) with a display 118, and an optional audio presentation device (APD) 120. An exemplary APD 120 may be a surround sound receiver controlling one or more audio reproduction devices (hereafter, generically, the speakers 122a, 122b) that are emitting sound 124a, 124b corresponding to the audio portion of the presented media content event. Other types of output devices may also be coupled to the media device 102, including those providing any sort of stimuli sensible by a human being, such as temperature, vibration and the like. The video portion of the media content event is displayed on the display 118 and the audio portion of the media content event is reproduced as sounds by one or more speakers 122a, 122b. In some embodiments, the media device 102 and one or more of the components of the media presentation system 104 may be integrated into a single electronic device.

An exemplary embodiment of the media content presentation system 100 detects the background noise 114 with one or more microphones 126, and/or may be detectable using other suitable sound detecting devices. A background noise level is determinable from the detected background noise.

Embodiments of the media presentation system 104 then compare the determined background noise level, preferably in the vicinity of the user, with the output audio volume of the audio portion of the presented media content event. In situations where the background noise level interferes with the listening of the audio content of the media content event by the user, embodiments of the media content presentation system 100 visually presents text on the display 118 to the users 110*a*, 110*b*, wherein the text corresponds to at least the dialogue of the audio portion of the presented media content event. However, embodiments of the media content presentation system 100 provide several enhanced features over legacy media content presentation systems.

Prior to presenting the text corresponding to the audio content dialogue, a first example embodiment dynamically adjusts output volume of the audio content from the speakers 122*a*, 122*b* within some predefined range before the level of the background noise 114 is at, or increases to, a maximum background noise level threshold. When the determined level of the background noise 114 increases above the maximum background noise level threshold, and after the output audio volume has already been increased to a maximum volume level threshold, presentation of text is then initiated. Presentation of the audio portion of the presented media content event from the speakers 122*a*, 122*b* may optionally continue concurrently with, and in synchronization with, presentation of the text.

Alternatively, or additionally, a second example embodiment discriminates between the presented content and other presented content, such as commercials, advertisements, or the like, that are interspersed between segments of the presented media content event. When a commercial, advertisement, or the like is then detected (and thus, corresponds to the end of presentation of the current segment of the media content event), presentation of the text is discontinued. When presentation of the next media content event segment begins, presentation of text resumes (so long as the background noise level in the immediate vicinity of the user continues to exceed some predefined threshold).

Alternatively, or additionally, a third example embodiment accounts for the distance of the users 110*a*, 110*b* from the sound source of the presented audio content. It is appreciated that as a user moves farther away from the sound source of the presented audio content, the apparent loudness of the audio content decreases due to attenuation, even though the output audio volume of the audio content remains constant. Accordingly, the example third embodiment determines user location or distance from the sound source of the presented audio content, and then dynamically adjust the value of the background noise level threshold that the determined background noise level is compared with.

Alternatively, or additionally, a fourth example embodiment compares the determined background noise level, preferably in the vicinity of the user, with another maximum background noise level threshold. If the detected background noise level exceeds that particular maximum background noise level threshold, regardless of the output audio volume, presentation of text is initiated.

Alternatively, or additionally, a fifth example embodiment monitors for loss of the audio content. Upon detecting a loss of output of the audio content, presentation of text is initiated.

Alternatively, or additionally, a sixth example embodiment determines sentences form the determined text. When text is initially presented on the display 118, presentation of the text begins with a beginning portion of a current sentence of dialogue. When presentation of the text is to be discontinued, the presentation continues until after an end portion of the last sentence is presented.

Typically, the media content presentation system 100 is presenting the media content event to one or more users 110*a*, 110*b* in the media environment 108, which may correspond to a room in a house or the like. The background noise source 112 is illustrated as being outside of the media environment 108. However, the background noise source 112 might be in the media environment 108 itself or in an adjacent room or the like. For example, a loud appliance or the like may be operating in an adjacent or nearby room of the user's home. As another non-limiting example, the background noise source 112 may correspond to an outside construction project or the like that is using heavy construction equipment. Although there may be some level of noise level attenuation of the interfering background noise 114 from the appliance or the construction project as the background noise 114 passes through the walls of the media environment 108, the sound may still remain sufficiently loud so as to become interfering with the ability of the users 110*a*, 110*b* to discern the dialogue and/or enjoy the sound 124*a*, 124*b* of the audio portion of the presented media content event.

In the simplified hypothetical example illustrated in FIG. 1, the microphone 126 is located in close proximity to the user 110*a*. The microphone 126 detects the loudness (magnitude, amplitude, or the like) of sound in the immediate vicinity of the user 110*a* since the microphone 126 itself is in the immediate vicinity of the user 110*a*. The detected sound is processed into a sound level signal or the like corresponding to the loudness of the detected sound. The sound level signal is further processed to determine or estimate the background noise level. It is appreciated that the sound detected by the microphone 126 includes both the background noise 114 generated by the background noise source 112 and the sound 124*a*, 124*b* generated by the speakers 122*a*, 122*b*.

It is appreciated that a discrimination between the sound level of the background noise 114 and the level of the sound 124*a*, 124*b* of the audio portion of the presented media content event must be made in order for a meaningful comparison between the sound level of the background noise 114 and the level of the sound 124*a*, 124*b* of the audio portion of the presented media content event.

In an example embodiment, the media device 102 and/or components of the media presentation system 104 have been set to output a specified output volume level by at least one of the users 110*a*, 110*b*. That is, one of the users has likely specified a volume level setting for the output volume level to the media device 102 and/or components of the media presentation system 104. Based on the specified volume level setting, an example embodiment estimates the level of sound that is output from the speakers 122*a*, 122*b*.

Attenuation of the output pound from the speakers 122*a*, 122*b* may be optionally considered in the estimation so that an estimated level of sound 124*a*, 124*b* of the audio portion of the presented media content event is determined based on the distances D1, D2 of the users 110*a*, 110*b* from the speakers 122*a*, 122*b* or another reference point.

In an example embodiment, the value of the background noise 114 is a difference between the estimated sound level of the audio portion of the presented media content event and the level of sound determined from the sound level detected by the microphone 126. In an example embodiment, if the difference exceeds some predefined background noise level threshold, then presentation of the text corresponding to the dialogue of the audio portion of the presented media content event is initiated.

It is appreciated that level of the background noise 114 is likely to be fluctuating so that at times, the background noise 114 does not interfere with the listening of the audio portion of the presented media content event by the users 110*a*, 110*b*. At other times the background noise 114 may interfere with the listening of the audio portion of the presented media content event. For those durations, or periods of time, that the value of the background noise level threshold is sufficiently high enough to interfere with the listening of the audio content, embodiments present text on the display 118 corresponding to the dialogue of the audio content.

Some embodiments may employ a transient noise level threshold duration before initiation of text presentations. That is, if the level of the background noise 114 increases to an interfering level for only a brief period of time, initiation of the text presentation is not initiated. If the level of the background noise 114 persists for longer than the predefined transient noise level threshold duration, presentation of the text is initiated. Thus, for transient type increases in the level of the background noise 114, text is not presented (because such text may be distracting to the users 110a, 110b). When the duration of the interfering level of the background noise 114 persists for a predefined transient noise level threshold duration, presentation of text is then initiated.

In some embodiments, dialogue text is determined beginning at the time that the level of the background noise 114 increases to the background noise level threshold, but the text is not initially displayed. If the sound level of the background noise 114 remains greater than the threshold level for at least the transient noise level threshold duration, the text beginning at the time that the level of the background noise 114 increased to the interfering level is presented. Thus, the users 110a, 110b may read the entirety of the text that was otherwise interfered with by the increase in the background noise 114.

Presentation of the text continues until the level of the background noise 114 decreases to the interfering sound level threshold (or another lesser threshold). When the level of the background noise 114 decreases below the maximum background noise level threshold or some other predefined background noise level threshold, presentation of the text is discontinued.

In some embodiments, presentation of text continues for some predefined duration after the level of the background noise 114 decreases below the controlling background noise level threshold. Accordingly, if the sound level again increases above the interfering sound level threshold before the end of the duration, presentation of the text remains ongoing. That is, the users 110a, 110b are able to read the entirety of the text. Otherwise, repetitive presentation of the text with short gaps (durations) without presented text may be relatively distracting to the users 110a, 110b.

In some embodiments, the comparison of the level of the background noise 114 to the level of the sound of the audio portion of the presented media content event may be based on a ratio between the sound level of the background noise 114 and the estimated sound level of the audio portion of the presented media content event. Alternatively, or additionally, the ratio may be based on the sound level detected by the microphone 126 and the estimated sound level of the audio portion of the presented media content event. In such embodiments, if the determined ratio exceeds a predefined ratio threshold, then presentation of the text is initiated. When the determined ratio decreases to below the ratio threshold (or another ratio threshold), then presentation of the text may be discontinued. In some embodiments, the determined ratio must decrease below the ratio threshold for at least some predefined duration before text presentation is discontinued.

In some instances, the transient increase in the detected level of sound at the microphone 126 may be due to an increase in the volume of the audio portion of the presented media content event. For example, if during a conversation between two actors in a movie, a sudden and unexpected explosion occurs, the sound level of the audio portion of the presented media content event may briefly increase. In such situations, the estimated sound level of the audio portion of the presented media content event is increased for purposes of the comparison with the level of sound detected by the microphone 126. In such situations, an increase in the loudness of the output sound from the speakers 122a, 122b caused by a volume level increase of the audio portion of the presented media content event does not cause initiation of the presented text.

In some embodiments, the determined background noise level is determined by processing and memory components (not shown) in the microphone 126. Alternatively, information corresponding to the sound level signal is communicated to the media device 102 and/or a component of the media presentation system 104. The media device 102 and/or a component of the media presentation system 104, in response to receiving the information from the microphone 126, then determines the background noise level. Based on the determined background noise level, the comparison between the determined background noise level and the sound level of the audio portion of the presented media content event are compared to determine if, and when, the text corresponding to the dialogue of the audio portion of the presented media content event should be presented on the display 118.

The microphone 126 may be communicatively coupled to the media device 102 and/or the component of the media presentation system 104 using any suitable communication medium. For example, an infrared or radio frequency (RF) wireless signal medium may be used. Alternatively, a wire-based medium may be used to communicate the information over a suitable physical connector between the microphone 126 and the media device 102 and/or the component of the media presentation system 104.

Figure 2:
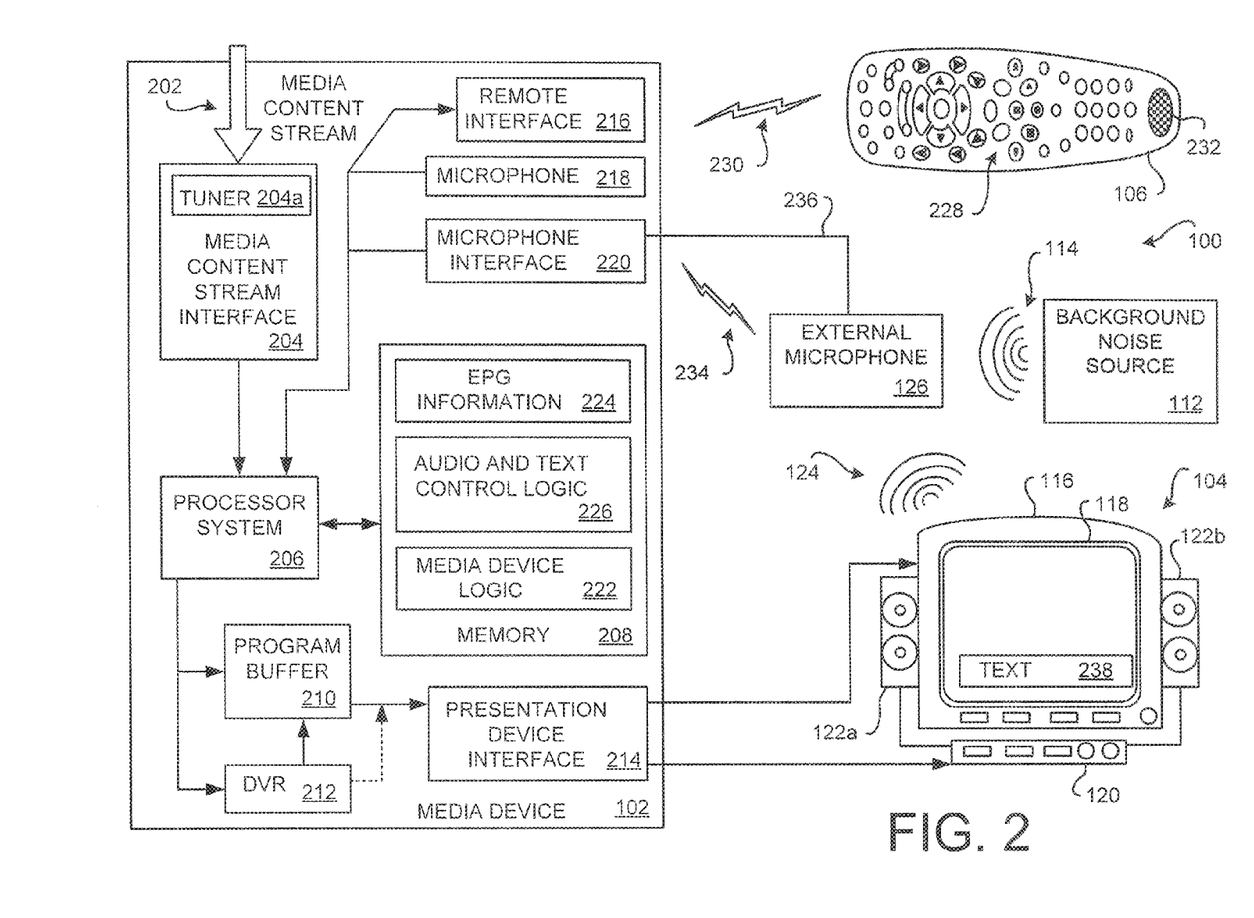
FIG. 2 is a block diagram of the media content presentation system implemented in an example media device.

FIG. 2 is a block diagram of the media content presentation system 100 implemented in the example media device 102. Embodiments of the media content presentation system 100 may be implemented in other media devices, such as, but not limited to, stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event that is received in a media content stream 202.

The non-limiting exemplary media device 102 comprises a media content stream interface 204, a processor system 206, a memory 208, a program buffer 210, an optional digital video recorder (DVR) 212, a presentation device interface 214, a remote interface 216, an optional microphone 218, and an optional microphone interface 220. The memory 208 comprises portions for storing the media device logic 222, the electronic program guide (EPG) information 224, and the audio and text control logic 226. In some embodiments, the media device logic 222 and the audio and text control logic 226 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. A media content provider provides media content that is received in one or more multiple media content streams 202 multiplexed together in one or more transport channels. The transport channels with the media content streams 202 are communicated to the media device 102 from a media system sourced from a remote head end facility (not shown) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 202 can be received from one or more different sources, such as, but not limited to, a cable system, a radio frequency (RF) communication system, or the Internet. The media content stream 202 may be alternatively received from an external device, such as a digital video disk (DVD) player, flash memory medium, or other suitable memory medium device that stores a media content event.

The one or more media content streams 202 are received by the media content stream interface 204. In a broadcast environment, one or more tuners 204a in the media content stream interface 204 selectively tune to one of the media content streams 202 in accordance with instructions received from the processor system 206. The processor system 206, executing the media device logic 222 and based upon a request for a media content event of interest specified by one of the users 110a, 110b (FIG. 1), parses out media content associated with the media content event of interest. The media content event of interest is then assembled into a stream of video and/or audio information which may be stored by the program buffer 210 such that the media content can be streamed out to components of the media presentation system 104, such as the visual display device 116 and/or the audio presentation device 120, via the presentation device interface 214. Alternatively, or additionally, the parsed out media content may be saved into the DVR 212 for later presentation. The DVR 212 may be directly provided in, locally connected to, or remotely connected to, the media device 102. In alternative embodiments, the media content streams 202 may stored for later decompression, processing and/or decryption.

From time to time, information populating the EPG information 224 portion of the memory 208 is communicated to the media device 102, via the media content stream 104 or via another suitable media. The EPG information 224 stores the information pertaining to the scheduled programming of media content events. The information may include, but is not limited to, a scheduled presentation start and/or end time, a program channel, and descriptive information. The media content event's descriptive information may include the title of the media content event, names of performers or actors, date of creation, and a summary describing the nature of the media content event. Any suitable information may be included in the supplemental information. Upon receipt of a command from the user requesting presentation of an EPG menu (not shown), the information in the EPG information 224 is retrieved, formatted, and then presented on the display 118 as an EPG menu.

The exemplary media device 102 is configured to receive commands from a user via a remote control 106. The remote control 106 includes one or more controllers 228 disposed on the surface of the remote control 106. The user, by actuating one or more of the controllers 228, causes the remote control 106 to generate and transmit commands, via a wireless signal 230, to the media device 102. The commands control the media device 102 and/or control components of the media presentation system 104. The wireless signal 230 may be an infrared (IR) signal or a radio frequency (RF) signal that is detectable by the remote interface 216.

The processes performed by the media device 102 relating to the processing of the received media content stream 202 and communication of a presentable media content event to the components of the media presentation system 104 are generally implemented by the processor system 206 while executing the media device logic 222. Thus, the media device 102 may perform a variety of functions related to the processing and presentation of one or more media content events received in the media content stream 202.

In some embodiments, the remote control 106 may optionally include a microphone 232 that is configured to detect sound. Assuming that the remote control 106 is in close proximity to at least one of the users 110a, 110b, the microphone 232 of the remote control 106 will detect sound in the vicinity of the user 110a, 110b who is close to the remote control 106. Thus, the wireless signal 230 may include information corresponding to the detected level of sound or the determined noise level, such as but not limited to, the level of the background noise 114.

Some embodiments of the media device 102 may optionally include the microphone interface 220. The microphone interface 220 is configured to communicatively couple to one or more external microphones 126. An example microphone 126 may communicate detected sound level information to the media device using a suitable wireless signal 234. In some embodiments, the remote interface 216 may be optionally configured to detect the emitted wireless signal 234. Alternatively, or additionally, the microphone interface 220 may be configured to couple to a physical connector 236 that is also coupled to the microphone 126. Any suitable wire-based connector 236 may be used. Accordingly, some embodiments may be configured to receive information from a plurality of microphones 126, 232.

When the sound level of the background noise 114 begins to interfere with the listening of the audio portion of the presented media content event, embodiments of the media content presentation system 100 present text 238 on the display 118. The text 238 corresponds to the dialogue of the audio portion of the presented media content event. The non-limiting example text 238 may be presented alone, in a banner, in a pop-up window, or the like, as scrolling text. Thus, at any given instant, a portion of the text of the audio portion of the presented media content event may be read by the users 110a, 110b. The text 238 may be presented in any suitable format and/or font. Multiple lines of text 238 may be presented. The text 238 may be presented in any suitable location on the display 118.

The words of the text 238 may be determined in various manners. An example embodiment accesses the closed captioning text of the media content stream 202, if available. The text available from the closed captioning stream is selected as needed for the determined text 238.

Alternatively, or additionally, the audio and text control logic 226 may include a suitable audio to text conversion engine that generates the text based on dialogue of the audio portion of the presented media content event. Thus, words (dialogue) spoken in the audio portion are identified, and then corresponding text is determined. Any suitable audio to text conversion engine may be used by embodiments of the media content presentation system 100.

Alternatively, or additionally, the text may be included in meta data of the media content stream 202. For example, the text may be available in a foreign language text stream included in the media content stream. Here, the audio and text control logic 226 would convert the foreign language text to the native language of the users 110a, 110b using a language conversion engine. Any suitable language conversion engine may be used by embodiments of the media content presentation system 100.

Embodiments of the media content presentation system 100 provide at least one of several enhanced features over legacy media content presentation systems. In the first example embodiment, prior to presenting the text corresponding to the dialogue of the audio content, output volume of the audio content from the speakers 122a, 122b is dynamically adjusted within some predefined range. Here, the microphone 126, 232 continuously monitors the background noise 114. The level of the background noise 114 is then continuously determined.

During the process of watching a media content event, the users 110a, 110b may have specified a level of output sound from the speakers 122a, 122b for the audio portion of the presented media content event that is below a predefined maximum output volume level threshold. Here, the users 110a, 110b presumably have configured to media presentation system 104 to output a pleasing level of sound from the speakers 122a, 122b, likely in the absence of, or at least in the presence of a relatively low level, of the background noise 114. In some instances, level of output sound from the speakers 122a, 122b may have been specified prior to the occurrence of the background noise 114.

When the level of the background noise 114 increases to a point that is likely to interfere with the users 110a, 110b being able to discern the audio portion of the presented media content event, based upon a predefined first background noise level threshold, this example embodiment increases the output sound level for the audio portion of the presented media content event so that the output sound level become relatively louder (wherein text associated with the audio portion of the presented media content event is not presented on the display 118). That is, as the level of the background noise 114 increases up to the predefined first background noise level threshold, the output level of sound from the speakers 122a, 122b begins to be increased so as to counter the interference of the background noise 114. Thus, the users 110a, 110b will be better able to hear and audibly discern the dialogue of the audio portion of the presented media content event which is presented at an increasingly higher volume level.

The output sound level for the audio portion of the presented media content event may be further increased as needed if the volume level if the background noise 114 continues to increase. Here, text corresponding to the audio portion of the presented media content event has not yet been presented on the display 118.

If the volume level of the background noise 114 decreases, then the level of output sound from the speakers 122a, 122b for the audio portion of the presented media content event may be correspondingly decreased. The output sound level may be decreased to the originally specified output sound level in effect prior to the increase.

In some embodiments, the decrease in the output sound level for the audio portion of the presented media content event may be delayed for some predefined duration so that in the event that the background noise 114 sound level later increases within the predefined duration, no further adjusting increase of the output sound is required. (Thus, a potential undesirable hunting effect caused by a continuing adjustment of the output sound based on the following of transient changes in the background noise 114 is avoided. Such hunting effects are well known in the arts of control theory.)

If the volume level of the background noise 114 continues to increase, the level of output sound from the speakers 122a, 122b is increased up to a maximum volume level threshold. In an example embodiment, the users 110a, 110b specify the maximum volume level threshold for which the level of output sound from the speakers 122a, 122b is not to exceed.

If the volume level of the background noise 114 further increases after the level of output sound from the speakers 122a, 122b has increased up to the maximum volume level threshold, then presentation of text is initiated. That is, the first example embodiment is configured to initiate presentation of the text only after the point in which the level of output sound from the speakers 122a, 122b has been increased to the maximum volume level threshold.

An alternative first embodiment may determine the text when the volume level of the background noise 114 increases to first predefined background noise threshold level that is less than the maximum volume level threshold. The determined text, or a current portion thereof, is saved or buffered. If the volume level of the background noise 114 continues to increase and reaches the maximum background noise level threshold, this alternative first example embodiment is configured to then initiate presentation of the text beginning with the most current saved or buffered portion of the determined text. In an example non-limiting embodiment, the presented text is determined when the volume level of the background noise 114 reaches the first predefined background noise threshold level. When the level of the background noise 114 reaches a point where the maximum level of output sound from the speakers 122a, 122b is reached, the alternative first embodiment begins to present the text. However, the presentation of the text begins with the previously determined text for some predefined durations, such as by five seconds or some other suitable duration. Accordingly, the users 110a, 110b are able to read text for dialogue that they have already heard, and thus better appreciate the context of the dialogue that they are now beginning to read.

Alternatively, or additionally, a second example embodiment discriminates between the presented content and presented commercials, advertisements, or the like, that is interspersed between segments of the presented media content event. This embodiment does not present the text of presented commercials, advertisements, or the like because the users 110a, 110b presumably are not interested in reading such text. This embodiment reduces computation requirements of the media content presentation system 100.

In this example second embodiment, presentation of text continues (so long as the level of the background noise 114 in the vicinity of the users 110a, 110b exceeds the predefined threshold) during the duration of a currently presented segment of the media content event. When a commercial, advertisement, or the like is then detected (and thus, corresponds to the end of presentation of the current segment of the media content event), presentation of the text is discontinued. When presentation of the next media content event segment begins, presentation of text resumes (so long as the background noise level in the immediate vicinity of the user continues to exceed some predefined threshold).

Detection of the commercial, advertisement, or the like may be based on any suitable process. For example, the metadata may include information that identifies the media content event and identifies commercials, advertisements, or the like. Such metadata information may be used to identify transitions between the media content event and the commercial, advertisement, or the like. That is, the metadata information may therefore be used to discontinue text presentation in response to the occurrence of a commercial, advertisement, or the like, and then resume text presentation when presentation of the media content event resumes.

Alternatively, or additionally, screen characteristics of the video content may be analyzed to identify transitions between the media content event to the commercial, advertisement, or the like. For example, a black or blank screen may indicate transitions between the media content event to the commercial, advertisement, or the like. A change in the number of and/or types of moving vectors may indicate transitions between the media content event to the commercial, advertisement, or the like.

Alternatively, or additionally, sound characteristics of the audio content may be analyzed to identify transitions between the media content event to the commercial, advertisement, or the like. For example, a change in volume, background noise, and/or speakers (identified by their unique voice signatures) may indicate transitions between the media content event to the commercial, advertisement, or the like.

Alternatively, or additionally, a third example embodiment accounts for the distance of the users 110a, 110b from the sound source of the presented audio content. Here, the user 110a is illustrated as being at a distance D1 from the media presentation system 104. The user 110b is at a farther distance D2 from the media presentation system 104. Here, the user 110a is closer to the speakers 122a, 122b outputting the audio portion of the presented media content event than the user 110b.

It is appreciated that as a user moves farther away from the sound source of the presented audio content, the apparent loudness of the audio content decreases due to attenuation, even though the output audio volume of the audio content remains constant. In view of the differing distances D1, D2 of the users 110a, 110b, respectively, the apparent perceived sound level of the sound 124a, 124b from the speakers 122a, 122b, will appear to be louder to the user 110a than to the user 110b.

Accordingly, some embodiments determine user location or distance from the sound source of the presented audio content or another suitable reference point. Then, the third embodiment adjusts the value of the maximum background noise level threshold that is compared with the determined background noise level. Thus, the maximum background noise level threshold user for the first user 110a is greater than the maximum background noise level threshold user for the second user 110b since the first user 110a is closer to the speakers 122a, 122b. That is, since the level of output sound from the speakers 122a, 122b appears to be greater to the first user 110a, the amount of interfering background noise 114 can be greater before the listening by the user 110a is interfered with.

Distance may be detected by any suitable detector 128 that senses location of the users 110a, 110b. The audio and text control logic 226 may then determine the distances D1, D2 based on the information provided by the detector 128. The detector 128 may, in one embodiment, be a heat detector, motion detector, or the like. Alternatively, or additionally, the detector 128 may be a pressure sensor or the like that detects physical presence of one of the users 110a, 110b, such as when they are seated in a chair or the like. Another embodiment may employ an image capture device that graphically analyzes captured image data from which the distances D1, D2 are computed there from.

For example, if only the first user 110a is present in the media environment 108, and at the determined distance D1, a first maximum background noise level threshold is used to determine when presentation of the text is initiated. When only the second user 110b is present in the media environment 108, or even if both users 110a, 110b are present, a second maximum background noise level threshold is used to determine when presentation of the text is initiated. The level of the first maximum background noise level threshold is less that the level of the second maximum background noise level threshold because the closer user 110a is better able to hear and discern the sounds 124a, 124b emitted by the speakers 122a, 122b. Since the second user 110b is farther away, at the distance D2, that user will not be able to hear the sounds 124a, 124b emitted by the speakers 122a, 122b as well as the first user 110a. Therefore, the presentation of text should be initiated at the lower maximum background noise level threshold since the second user is less able to hear and discern the sounds 124a, 124b emitted by the speakers 122a, 122b.

Alternatively, or additionally, a fourth example embodiment compares the determined background noise level, preferably in the vicinity of the user, with a highest background noise level threshold. The value of the highest background noise level threshold is preferably larger than values of the above-described maximum background noise level thresholds used for the other above-described embodiments. If the detected level of the background noise 114 exceeds the highest background noise level threshold, regardless of the output audio volume emitted by the speakers 122a, 122b, presentation of text is initiated.

With the fourth example embodiment, when the volume level of the background noise 114 exceeds the predefined highest background noise level threshold, there is a presumption that the background noise 114 will always and immediately interfere with the listening of the audio portion of the presented media content event, regardless of the level of output sound from the speakers 122a, 122b. In the fourth embodiment, initiation of presentation of the text may begin immediately.

In an alternative fourth embodiment, a current portion of the text corresponding to a current portion of the audio portion of the presented media content event is determined, and then is buffered or saved, when the level of the background noise 114 reaches some predefined first volume level threshold. When presentation of the text is automatically initiated when the level of the background noise 114 reaches the highest background noise level threshold, the text may begin with the stored or buffered initial portion of text that immediately preceded the point in time where the background noise 114 exceeded the predefined highest background noise level threshold.

Alternatively, or additionally, a fifth example embodiment monitors for loss of the audio content. Loss of the audio content may occur when the media presentation system encounters difficulty in reproducing the audio content and/or fails to receive an audio signal of the media content. For example, the user may mute the audio volume or turn off the component that is presenting the audio content. Upon detecting a loss of the audio content, presentation of text is immediately initiated. The loss of the audio content can be monitored by the processor system 206 and/or by components of the media content presentation system 104.

In an alternative fifth embodiment, a current portion of the text corresponding to a current portion of the audio portion of the presented media content event is continuously determined, and then is buffered or saved. When presentation of the text is automatically initiated, the text may begin with the stored or buffered initial portion of text that immediately preceded the point in time where the audio content was lost.

In an example sixth embodiment, which may be included as a feature of the previous embodiments, the audio and text control logic 226 is configured to monitor the dialogue of the media content event to identify the beginning and/or end of a complete sentence of dialogue in the determined text. In this embodiment, a beginning of a current sentence of the text corresponding to a current portion of the audio portion of the presented media content event is determined, and then is buffered or saved. When presentation of the text is initiated, the text may begin with the stored or buffered beginning portion of the sentence that immediately preceded the point in time where the audio content was lost. Accordingly, the users 110a, 110b are presented a complete sentence when presentation of the text begins, thereby improving the ability of the users 110a, 110b to comprehend what is being spoken in the dialogue of the media content event. That is, initiating text presentation of text in the middle of a sentence of dialogue may be distracting and undesirable. Rather, the presented text begins with the beginning of a complete first sentence.

In such an embodiment, when the end of a sentence is detected, there is no need to further save of buffer the text of the completed previous sentence. Accordingly, at the detected beginning of the next sentence, that beginning portion of the next sentence is saved or buffered. Optionally, the text of the next sentence may overwrite the buffered or stored text of the previous sentence to more efficiently manage memory or buffer capacity.

When the level of the background noise 114 eventually decreases to the maximum background noise level threshold, or to another predefined background noise level threshold, the process of discontinuing presentation of the text may begin. Here, presentation of the text continues until the end of complete last sentence. That is, concluding presentation of the text in the middle of a sentence of dialogue may be distracting and undesirable. Rather, the presentation of the text ends with the ending of a complete last sentence The beginning and end of sentences of dialogue may be determined using any suitable indicator. Some audio to text engines identify pauses in spoken dialogue, and then insert suitable punctuation between the dialogue portions. Such punctuation may be used to identify the beginning and the end of dialogue sentences. More intelligent audio to text engines are capable of analyzing content, context and/or syntax of the dialogue to identify the beginning and end of dialogue sentences. Such engines may be incorporated into the audio and text control logic 226 by the various embodiments.

Figure 3:
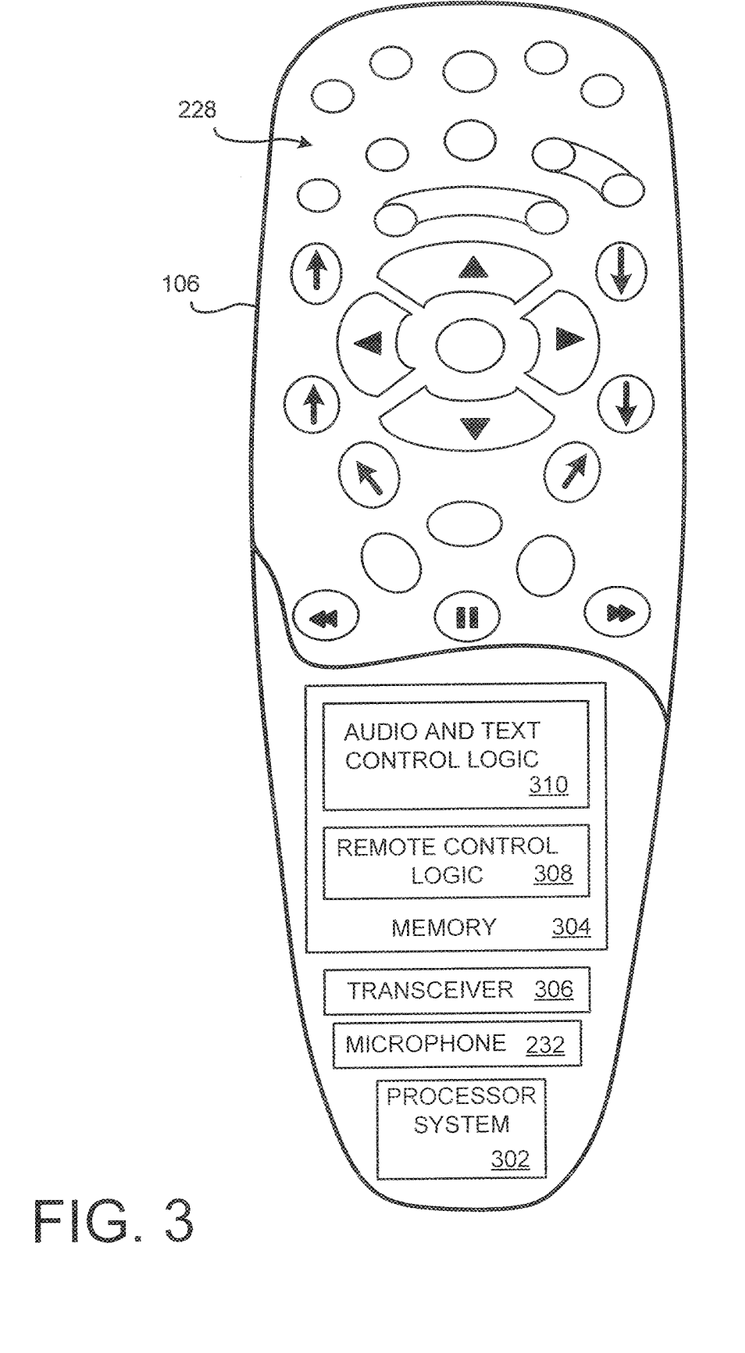
FIG. 3 is a block diagram of an embodiment of the media content presentation system implemented in a remote control.

FIG. 3 is a block diagram of an embodiment of the media content presentation system 100 implemented in a remote control 106. Various embodiments of the remote control 106 may be configured to operate in accordance with any one of the five above-described alternative embodiments and/or any one or more of the associated operating features described hereinabove The remote control 106 comprises a processor system 302, a memory 304, the microphone 232, and the transceiver 306. The memory 304 comprises portions for storing the remote control logic 308 and the audio and text control logic 310. In some embodiments, the remote control logic 308 and the audio and text control logic 310 may be integrated together, and/or may be integrated with other logic. In other embodiments, some or all of these memory and other data manipulation functions may be provided by and using remote server or other electronic devices suitably connected via the Internet or otherwise to a client device. Other remote controls 106 may include some, or may omit some, of the above-described media processing components. Further, additional components not described herein may be included in alternative embodiments The remote control logic 308 manages processing of user inputs received by one or more of the controllers 228, and manages generation and communication of associated control information. The control information is communicated in the wireless signal 230 (FIG. 2) emitted by the transceiver 306.

The microphone 232 detects sound in the vicinity of the remote control 106, which is presumably also in the near vicinity of one of the users 110a, 110b (FIG. 1). The remote control 106 determines the volume of the detected sound. Since the user 110a, 110b has likely used the remote control 106 to specify an output volume level from the speakers 122a, 122b, the remote control 106 uses this volume level specification information to determine an estimated sound level of the audio portion of the presented media content event that is being output from the speakers 122a, 122b. A comparison is then made between the detected sound at the remote control 106 and the estimated sound level of the audio portion of the presented media content event, thereby determining the level of the background noise 114.

In an example embodiment that optionally incorporates the first example embodiment (that dynamically adjusts output volume of the audio content from the speakers 122a, 122b within some predefined range), the remote control can determine volume control adjustments, and then issue control signals in the wireless signal 230 to control the level of output sound from the speakers 122a, 122b (which are controlled by the media device 102 and/or components of the media presentation system 104).

When the determined level of the background noise 114, or the ratio of the levels of background noise 114 to the estimated level of output sound from the speakers 122a, 122b, exceeds a predefined criteria, the remote control 106 generates a command that is communicated in the wireless signal 230 that causes the media device 102 and/or components of the media presentation system 104 to initiate presentation of the text that corresponds to the dialogue of the audio portion of the presented media content event. When the determined level or ratio decreases below the threshold, the remote control 106 generates a command that is communicated in the wireless signal 230 that causes the media device 102 and/or components of the media presentation system 104 to end presentation of the text.

An example embodiment of the remote control 106 may be configured as a universal type of remote control device that may operate a legacy media device 102 and/or legacy components of the media presentation system 104. When output volume from the speakers 122a, 122b is to be increased or decreased in response to detected levels of the background noise 114, the volume up (increase) and volume down (decrease) control commands can be directly issued by the remote control 106. When text is to be presented, commands configured to initiate or end presentation of closed captioning text may be directly issued by the remote control 106 based on closed captioning on and closed captioning off commands.

In an example embodiment, the function of the remote control 106 is limited to the controlling of the media device 102 and/or components of the media presentation system 104. Thus, the remote control 106 consists of the transceiver 306 that is configured to emit low power (low range) IR or RF signals detectable by the remote interface 216 (FIG. 2). This example remote control 106 does not include another transceiver and/or interface device that is configured to wirelessly connect to a mobile cellular system, a WiFi network, the Internet and/or another type of communication system.

It should be emphasized that the above-described embodiments of the media content presentation system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for presenting a media content event comprising a video portion and an associated audio portion to a user, the method comprising:
   determining a distance from the user and one of a speaker that is presenting the audio portion and a reference point associated with a display;
   adjusting at least a value of one of a first background noise level threshold and a maximum background noise level threshold based on the determined distance of the user,
      wherein the first background noise level threshold is decreased for increasing distances of the user,
      wherein the first background noise level threshold is increased for decreasing distances of the user,
      wherein the maximum background noise level threshold is decreased for increasing distances of the user, and
      wherein the maximum background noise level threshold is increased for decreasing distances of the user;
   comparing a detected level of background noise with the first background noise level threshold,
      wherein the level of background noise is in the vicinity of the user viewing the media content event;
   increasing output volume of the presented audio portion of the media content event when the level of background noise exceeds the first background noise level threshold,
      wherein the output volume of the presented audio portion of the media content event is increased with increasing levels of background noise,
      wherein the output volume is increased up to a maximum volume level threshold as the level of background noise increases, and
      wherein the maximum volume level threshold corresponds to a maximum predefined volume that the presented audio portion of the media content event can be increased to;
   determining text when the level of background noise exceeds a second background noise level threshold,
      wherein the determined text corresponds to dialogue in the audio portion of the media content event, and
      wherein the second background noise level threshold is greater than the first background noise level threshold;
   determining sentences from the determined text,
      wherein each determined sentence has a beginning portion and an end portion; and
   presenting the text on the display a beginning portion of a current sentence in the dialogue when an increasing level of background noise exceeds the maximum background noise level threshold,
      wherein the maximum background noise level threshold is greater than the second background noise level threshold.

2. A method for presenting a media content event comprising a video portion and an associated audio portion to a user, the method comprising:
   comparing a detected level of background noise with a first background noise level threshold,
      wherein the level of background noise is in the vicinity of the user viewing the media content event;
   increasing output volume of the presented audio portion of the media content event when the level of background noise exceeds the first background noise level threshold,
      wherein the output volume of the presented audio portion of the media content event is increased with increasing levels of background noise,
      wherein the output volume is increased up to a maximum volume level threshold as the level of background noise increases, and
      wherein the maximum volume level threshold corresponds to a maximum predefined volume that the presented audio portion of the media content event can be increased to;
   determining text when the level of background noise exceeds a second background noise level threshold,
      wherein the determined text corresponds to dialogue in the audio portion of the media content event, and
      wherein the second background noise level threshold is greater than the first background noise level threshold;
   determining sentences from the determined text,
      wherein each determined sentence has a beginning portion and an end portion;
   presenting the text on a display the beginning portion of a current sentence in the dialogue when the increasing level of background noise exceeds a maximum background noise level threshold,
      wherein the maximum background noise level threshold is greater than the second background noise level threshold;
   continuing to present the text on the display until the level of background noise decreases to a third background noise level threshold;
   continuing to determine the text after the level of background noise decreases to the third background noise level threshold; and
   continuing to present the text on the display until the end portion of a last sentence in the dialogue of the text is presented on the display.

3. The method of claim 2, wherein the third background noise level threshold is the same as the maximum background noise level threshold.

4. The method of claim 2, wherein the third background noise level threshold is less than the maximum background noise level threshold and is greater than the second background noise level threshold.

5. The method of claim 2, further comprising:
   decreasing the output volume of the presented audio portion of the media content event when the level of background noise decreases below the third background noise level threshold,
wherein the output volume of the presented audio portion of the media content event continues to be decreased with decreasing levels of background noise, and
wherein the output volume is decreased at most down to a user specified volume level threshold as the level of background noise decreases.

6. The method of claim 1, further comprising:
immediately presenting the text on the display when the level of background noise exceeds a third background noise level threshold,
wherein the third background noise level threshold is greater than the maximum background noise level threshold.

7. The method of claim 6, wherein response to the level of background noise immediately exceeding the third background noise level threshold, further comprising:
maintaining the output volume of the presented audio portion of the media content event.

8. A method for presenting a media content event comprising a video portion and an associated audio portion to a user, the method comprising:
comparing a detected level of background noise with a first background noise level threshold,
wherein the level of background noise is in the vicinity of the user viewing the media content event;
increasing output volume of the presented audio portion of the media content event when the level of background noise exceeds the first background noise level threshold,
wherein the output volume of the presented audio portion of the media content event is increased with increasing levels of background noise,
wherein the output volume is increased up to a maximum volume level threshold as the level of background noise increases, and
wherein the maximum volume level threshold corresponds to a maximum predefined volume that the presented audio portion of the media content event can be increased to;
determining text when the level of background noise exceeds a second background noise level threshold,
wherein the determined text corresponds to dialogue in the audio portion of the media content event, and
wherein the second background noise level threshold is greater than the first background noise level threshold;
determining sentences from the determined text,
wherein each determined sentence has a beginning portion and an end portion;
presenting the text on a display the beginning portion of a current sentence in the dialogue when the increasing level of background noise exceeds a maximum background noise level threshold,
wherein the maximum background noise level threshold is greater than the second background noise level threshold,
wherein the media content event is a series of media content event portions with intervening other content that is different from the media content event, the method further comprising:
continuing to present the text on the display during presentation of a current portion of the media content event;
detecting when the current portion of the media content event concludes and is followed by the other content;
discontinuing presentation of the text while the other content is being presented; and
resuming presentation of the text when the other content concludes and is followed by a next portion of the media content event.

9. The method of claim 1, further comprising:
estimating a level of the output volume of the presented audio portion of the media content event;
determining a difference between an estimated level of output volume with the detected level of background noise,
wherein the difference in the determined levels is compared with the first background noise level threshold, the second background noise level threshold and the maximum background noise level threshold.

10. The method of claim 1, further comprising:
estimating a level of the output volume of the presented audio portion of the media content event;
determining a ratio between the estimated level of output volume with the detected level of background noise,
wherein a difference in the determined ratio is compared with the first background noise level threshold, the second background noise level threshold and the maximum background noise level threshold.

11. The method of claim 1, wherein comparing the detected level of background noise with a first background noise level is performed by a remote control with a microphone, wherein the microphone detects the background noise, and wherein increasing the output volume of the presented audio portion of the media content event when the level of background noise exceeds the first background noise level threshold comprises:
generating a volume increase command, wherein the volume increase command corresponds to a volume increase command of a controller residing on a surface of the remote control; and
communicating the volume increase command to a media device that controls volume output of the audio portion of the media content event.

12. The method of claim 11, where in response to the increasing level of background noise exceeding the maximum background noise level threshold, further comprising:
communicating a closed captioning command from the remote control to the media device,
wherein the text is determined from closed captioning text that is presented on the display.

13. A method for presenting a media content event comprising a video portion and an associated audio portion to a user, the method comprising:
estimating output volume of the presented audio portion of the media content event based on a volume setting of a media device that controls the output volume;
determining a level of background noise based upon a difference between the estimated output volume of the presented audio portion of the media content event and a currently detected level of noise detected by a microphone in the vicinity of the user;
comparing the currently detected level of background noise with a first background noise level threshold,
wherein the level of background noise is in the vicinity of the user viewing the media content event;
increasing the output volume of the presented audio portion of the media content event when the level of background noise exceeds the first background noise level threshold, wherein the output volume of the presented audio portion of the media content event is increased with increasing levels of background noise, wherein the output volume is increased up to a maximum volume level threshold as the level of background noise increases, and wherein the maximum volume level threshold corresponds to a maximum predefined volume that the presented audio portion of the media content event can be increased to;

determining text when the level of background noise exceeds a second background noise level threshold, wherein the determined text corresponds to dialogue in the audio portion of the media content event, and wherein the second background noise level threshold is greater than the first background noise level threshold;

determining sentences from the determined text; and wherein each determined sentence has a beginning portion and an end portion, presenting the text on a display the beginning portion of a current sentence in the dialogue when the increasing level of background noise exceeds a maximum background noise level threshold, wherein the maximum background noise level threshold is greater than the second background noise level threshold.

14. A media content presentation system with a media device and a microphone, comprising:

a media content stream interface in the media device configured to receive a stream of video and audio content corresponding to a media content event;

a memory, wherein the memory comprises a first portion that stores at least media device logic and a second portion that stores audio and text control logic; and a processor system in the media device that is communicatively coupled to at least the media content stream interface and the memory, wherein the processor system processes the received stream of video and audio content and communicates the stream of video and audio content to a display in accordance with the media device logic, and wherein the processor is further configured, in accordance to the audio and text control logic:

estimate output volume of a presented audio portion of the media content event based on a volume setting of a component of the media content presentation system that controls the output volume;

determine a level of background noise based upon a difference between the estimated output volume of the presented audio portion of the media content event and a currently detected level of noise detected by a microphone in the vicinity of a user;

compare the determined level of background noise with a first background noise level threshold, wherein the level of background noise is in the vicinity of the user viewing the media content event;

increase the output volume of the presented audio portion of the media content event when the determined level of background noise exceeds the first background noise level threshold, wherein the output volume of the presented audio portion of the media content event is increased with increasing determined levels of background noise up to a maximum predefined volume;

after the volume has been increased to the maximum predefined volume, present text on the display when the increasing determined level of background noise exceeds a maximum background noise level threshold, wherein the text corresponds to dialogue of the audio content;

immediately present the text on the display when the determined level of background noise exceeds a second background noise level threshold, wherein the second background noise level threshold is greater than the maximum background noise level threshold;

determine a distance from the user and one of a speaker that is presenting the audio portion and a reference point associated with the display, wherein the first background noise level threshold is decreased for increasing distances of the user and wherein the first background noise level threshold is increased for decreasing distances of the user.

15. The media content presentation of claim 14, further comprising:

a microphone interface in the media device that communicatively couples the media device to the microphone, wherein the microphone is external to the media device.

16. The media content presentation of claim 14, further comprising:

a remote control interface in the media device that communicatively couples the media device to a remote control that is configured to communicate user commands to the media device, wherein the microphone resides in the remote control.

17. A remote control configured to communicate user commands to a media device, comprising:

a memory, wherein the memory comprises a first portion that stores remote control logic and a second portion that stores audio and text control logic;

a microphone configured to detect background noise; and a processor system that is communicatively coupled to at least the microphone and the memory, wherein the processor system generates the user commands in accordance with the remote control logic, and wherein the processor is further configured, in accordance to the audio and text control logic:

estimate output volume of a presented audio portion of a media content event based on a volume setting of the media device that controls the output volume;

determine a level of background noise based upon a difference between estimated output volume of the presented audio portion of the media content event and a currently detected level of noise detected by the microphone in the vicinity of a user;

compare the determined level of background noise with a first background noise level threshold;

communicate a volume increase command to increase the output volume of the presented audio portion of the media content event when the determined level of background noise exceeds the first background noise level threshold, wherein the output volume of the presented audio portion of the media content event is increased with increasing determined levels of background noise up to a maximum predefined volume; and after the volume has been increased to the maximum predefined volume, communicate a closed captioning command that causes the media device to present closed captioning text on a display when the increasing level of background noise exceeds a maximum background noise level threshold, wherein the text corresponds to dialogue of the audio content.

18. The media content presentation of claim 14, wherein the remote control consists of a single transceiver configured to communicate the user commands to the media device using one of a radio frequency (RF) medium or an infrared (IR) medium.

* * * * *